United States Patent
Kumagai et al.

(10) Patent No.: US 8,184,267 B2
(45) Date of Patent: May 22, 2012

(54) SURVEYING INSTRUMENT

(75) Inventors: Kaoru Kumagai, Itabashi-ku (JP);
Masahiro Saito, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 822 days.

(21) Appl. No.: 12/315,287

(22) Filed: Dec. 2, 2008

(65) Prior Publication Data
US 2009/0153667 A1 Jun. 18, 2009

(30) Foreign Application Priority Data
Dec. 14, 2007 (JP) ................. 2007-323117

(51) Int. Cl.
*G01C 3/14* (2006.01)
(52) U.S. Cl. .............. 356/3.08; 356/3.05; 356/3.16; 348/169
(58) Field of Classification Search .......... 348/169; 356/3.05, 3.08, 3.16
See application file for complete search history.

(56) References Cited

U.S. PATENT DOCUMENTS

| | | | |
|---|---|---|---|
| 3,857,639 A | 12/1974 | Mason | |
| 5,313,409 A | 5/1994 | Wiklund et al. | |
| 5,361,217 A | 11/1994 | Makimura et al. | |
| 5,548,409 A | 8/1996 | Ohta et al. | |
| 5,988,862 A | 11/1999 | Kacyra et al. | |
| 6,023,326 A | 2/2000 | Katayama et al. | |
| 6,057,537 A | 5/2000 | Schubert et al. | |
| 6,462,810 B1 | 10/2002 | Muraoka et al. | |
| 6,563,574 B2 | 5/2003 | Ohtomo et al. | |
| 6,611,664 B2* | 8/2003 | Kochi et al. | 396/324 |
| 6,618,126 B2* | 9/2003 | Shirai et al. | 356/5.1 |
| 6,859,269 B2* | 2/2005 | Ohtomo et al. | 356/141.1 |
| 7,564,488 B2* | 7/2009 | Kumagai et al. | 348/240.3 |
| 2001/0055484 A1* | 12/2001 | Kochi et al. | 396/324 |

(Continued)

FOREIGN PATENT DOCUMENTS
CN 1543200 A 11/2004
(Continued)

OTHER PUBLICATIONS

Chinese Communication (with English translation) dated Jan. 12, 2011 in corresponding foreign application CN 200810185509.2. 3rd Tech, DeltaSphere-3000 Laser 3D Scene Digitizer Brochure, Jun. 22, 2000, 2 pgs.

*Primary Examiner* — Kevin Bates
(74) *Attorney, Agent, or Firm* — Nields, Lemack & Frame, LLC

(57) ABSTRACT

The present invention provides a surveying instrument provided with a tracking function, said surveying instrument comprising a first image pickup means 40 with a first solid image pickup element 33, a second image pickup means 37 with a second solid image pickup element 19, an image pickup control instrument for controlling image pickup conditions of said first image pickup means and said second image pickup means, and a control unit for controlling the tracking operation of a target 36 based on a target image signal obtained at the first solid image pickup element or based on a target image signal obtained at the second solid image pickup element, wherein the first image pickup means can acquire an image in wider range by said second image pickup means, and wherein the image pickup control instrument controls so that a target image is acquired by the first image pickup means when the target image is out of a photodetection range of the target of the second solid image pickup element and controls so that the target image is acquired by the second image pickup means when the target image detected by the first solid image pickup element is within the predetermined range.

10 Claims, 7 Drawing Sheets

U.S. PATENT DOCUMENTS

| | | | |
|---|---|---|---|
| 2002/0012460 A1 * | 1/2002 | Kochi et al. | 382/154 |
| 2002/0093646 A1 * | 7/2002 | Muraoka et al. | 356/141.2 |
| 2004/0263625 A1 | 12/2004 | Ishigami et al. | |
| 2010/0209090 A1 * | 8/2010 | Kludas | 396/89 |

FOREIGN PATENT DOCUMENTS

| | | |
|---|---|---|
| EP | 1347267 A1 * | 9/2003 |
| JP | 58-053709 | 3/1983 |
| JP | 07-198383 | 8/1995 |
| JP | 07-332978 | 12/1995 |
| JP | 2000-346645 | 12/2000 |
| JP | 2001-090477 | 4/2001 |
| JP | 2003-149342 | 5/2003 |
| JP | 2003-240548 | 8/2003 |
| JP | 2003-279352 | 10/2003 |
| JP | 2004-132914 | 4/2004 |
| JP | 2004-170354 | 6/2004 |
| JP | 2004-343718 A | 12/2004 |

* cited by examiner

SURVEYING INSTRUMENT

BACKGROUND OF THE INVENTION

The present invention relates to a surveying instrument, and in particular, to a surveying instrument with a tracking function.

As a surveying instrument for measuring a distance, a horizontal angle and a vertical angle, a surveying instrument provided with a tracking function has been known in the past. In this type of the surveying instrument, an object reflector (target) such as a corner cube is collimated by a collimating telescope provided on the surveying instrument. A tracking light is projected from the collimating telescope, and when the target is moved, a reflection light from the target is received and the target can be automatically tracked.

Normally, in a surveying instrument with the tracking function, no operator is assigned on a surveying instrument side. A target is supported by a surveying operator, and the target is moved by the surveying operator for each measuring point. In case a moving speed of the target exceeds a following speed of the surveying instrument and the target goes out of a visual field of a collimating telescope or in case an obstacle such as a tree, a vehicle, a person, etc. temporarily comes into a space between the surveying instrument and the target, and the obstacle intercepts an optical path of the collimating telescope, the surveying instrument cannot receive a reflected light from the target, and an automatic tracking operation may be interrupted.

The reason for this is that, in a collimating telescope generally in use, a field angle (an angle of view) is as small as about 1° and a range to detect the reflection light for purpose of a tracking is too narrow.

When the tracking of the target is interrupted, the surveying instrument starts an operation to search the target. In the searching operation, the collimating telescope is rotated within a predetermined range in up-to-bottom direction and in left-to-right direction while the tracking light is projected for scanning and the target is detected.

As described above, the field angle of the collimating telescope is small. In order to re-detect the target, it is necessary to have a finer scanning pitch and to increase the number of the scanning operations.

For this reason, when the tracking is interrupted, much time is required for the purpose of detecting the target again and for starting the tracking operation. Further, under working conditions where the optical path is frequently intercepted by the obstacle, there are problems in that a working efficiency of the measurement operation is extremely decreased.

The surveying instrument provided with the tracking function is disclosed in JP-A-07-198383, JP-A-2000-346645, and JP-A-2004-170354.

SUMMARY OF THE INVENTION

What the present invention obtains is to provide a surveying instrument with the tracking function, by which it is possible to quickly re-detect an object reflector, to reduce the time to restore the automatic tracking operation, and to improve an efficiency of the measuring operation, when the object reflector is missed and the automatic tracking operation cannot be performed.

To attain the above object, the present invention provides a surveying instrument provided with a tracking function, the surveying instrument comprising a first image pickup means with a first solid image pickup element, a second image pickup means with a second solid image pickup element, an image pickup control instrument for controlling image pickup conditions of the first image pickup means and the second image pickup means, and a control unit for controlling the tracking operation of a target based on a target image signal obtained at the first solid image pickup element or based on a target image signal obtained at the second solid image pickup element, wherein the first image pickup means can acquire an image in wider range by the second image pickup means, and wherein the image pickup control instrument controls so that a target image is acquired by the first image pickup means when the target image is out of a photodetection range of the target of the second solid image pickup element and controls so that the target image is acquired by the second image pickup means when the target image detected by the first solid image pickup element is within the predetermined range. Also, the present invention provides the surveying instrument, wherein the control unit searches the target based on a target image signal obtained at the first solid image pickup element, and performs a collimation for a measurement based on a target image signal obtained at the second solid image pickup element. Further, the present invention provides the surveying instrument, wherein the predetermined range including an optical axis of the second image pickup means is set up, and when a photodetection position of the target by the second solid image pickup element is included in the predetermined range, a mask processing is performed on the second solid image pickup element so that a photodetection signal of the predetermined range is acquired, and the tracking operation is performed based on the photodetection signal of the predetermined range. Also, the present invention provides the surveying instrument, wherein when a photodetection position of the target is out of the predetermined range, the mask processing is canceled and the tracking operation is performed based on a photodetection signal from the second solid image pickup element.

The present invention provides a surveying instrument provided with the tracking function, the surveying instrument comprising a first image pickup means with a first solid image pickup element, a second image pickup means with a second solid image pickup element, an image pickup control instrument for controlling image pickup conditions of the first image pickup means and the second image pickup means, and a control unit for controlling the tracking operation of a target based on a target image signal obtained at the first solid image pickup element or based on a target image signal obtained at the second solid image pickup element, wherein the first image pickup means can acquire an image in wider range by the second image pickup means, and wherein the image pickup control instrument controls so that a target image is acquired by the first image pickup means when the target image is out of a photodetection range of the target of the second solid image pickup element and controls so that the target image is acquired by the second image pickup means when the target image detected by the first solid image pickup element is within the predetermined range. As a result, when a range where the tracking operation can be performed is increased and extended and when the target moves at high speed, an adequate action can be taken. Even when the target is missed out of sight and the automatic tracking operation cannot be carried out, the object reflector can be quickly re-detected. Accordingly, the time required to return to and to restore the automatic tracking operation is reduced, and an efficiency of the measuring operation is improved.

Also, the present invention provides the surveying instrument, wherein the control unit searches the target based on a target image signal obtained at the first solid image pickup element, and performs the collimation for a measurement based on a target image signal obtained at the second solid image pickup element. This makes it possible to perform quick searching in wider range by using a first image pickup means with wider range for the searching of the target. With respect to the tracking and the measurement, high accuracy can be assured by using a second image pickup means with wider range.

Further, the present invention provides the surveying instrument, wherein the predetermined range including an optical axis of the second image pickup means is set up, and when a photodetection position of the target by the second solid image pickup element is included in the predetermined range, the mask processing is performed on the second solid image pickup element so that a photodetection signal of the predetermined range is acquired, and the tracking operation is performed based on the photodetection signal of the predetermined range. This makes it possible to reduce an interference of a noise and to prevent an erroneous operation. Also, an amount of a data processing can be reduced and a burden of the data processing can be alleviated, and a processing speed can be increased.

Also, the present invention provides the surveying instrument, when a photodetection position of the target is out of the predetermined range, the mask processing is canceled and the tracking operation is performed based on a photodetection signal from the second solid image pickup element. As a result, it is possible to prevent the erroneous operation, to have a high efficiency of the data processing, and to reduce the range of tracking by the procedure of the mask processing.

BRIEF DESCRIPTION ON THE DRAWINGS

Figure 6A:
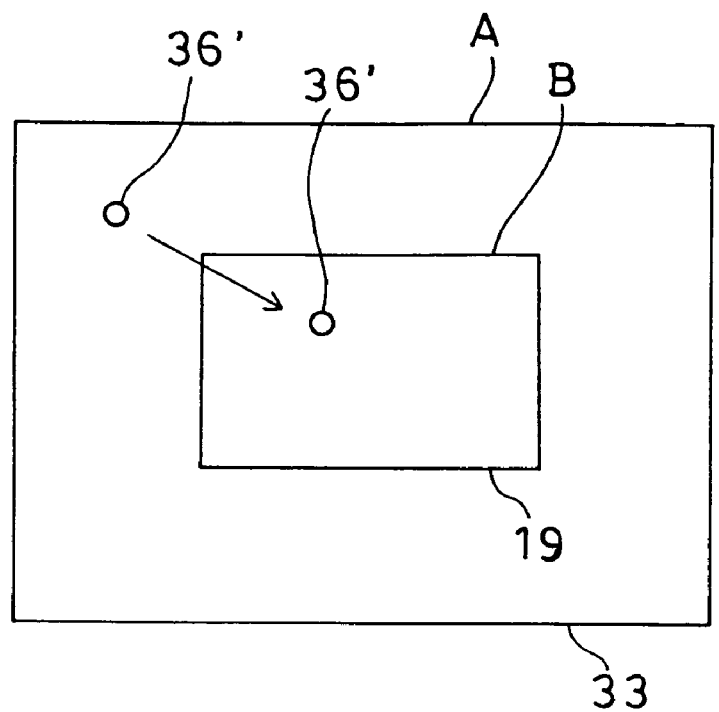
Figure 6B:
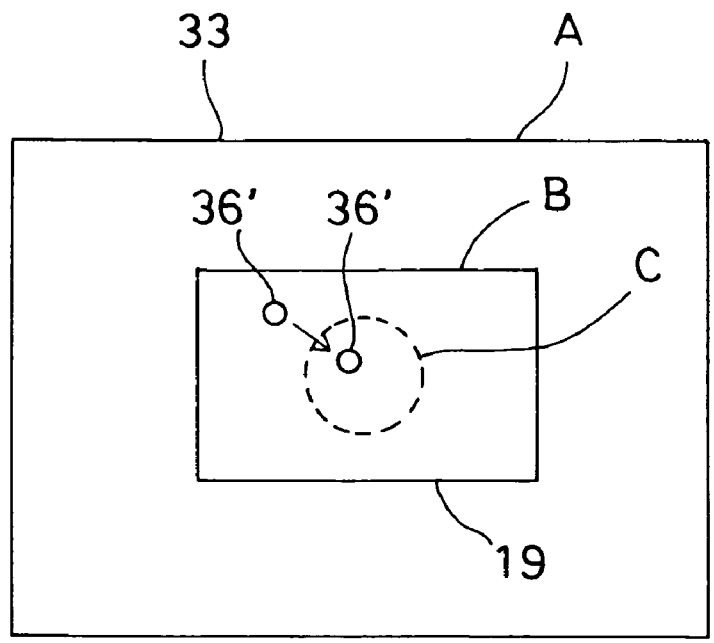
Figure 7:
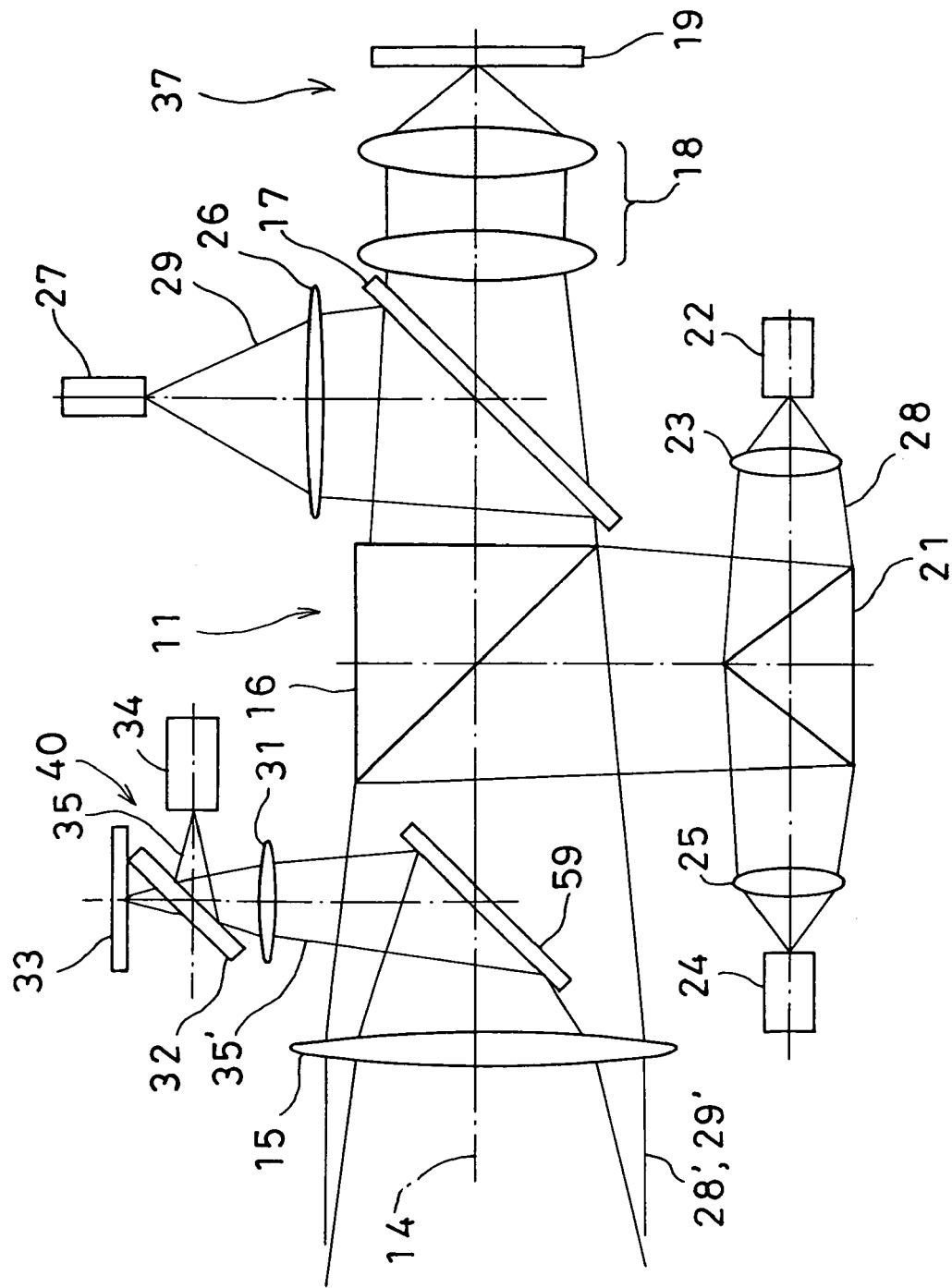

FIG. 6(A) and FIG. 6(B) each represents a schematical drawing to explain a relation of a first solid image pickup element and a second solid image pickup element with an image pickup area in the embodiment of the present invention; and FIG. 7 is a schematical drawing to explain an approximate arrangement of an optical system in a second embodiment of the present invention.

DETAILED DESCRIPTION OF THE PREFERRED EMBODIMENTS

A description will be given below on a best aspect for carrying out the present invention by referring to the attached drawings.

First, referring to FIG. 1 to FIG. 3, a description will be given on general features of a surveying instrument, in which the present invention is carried out.

Figure 1:
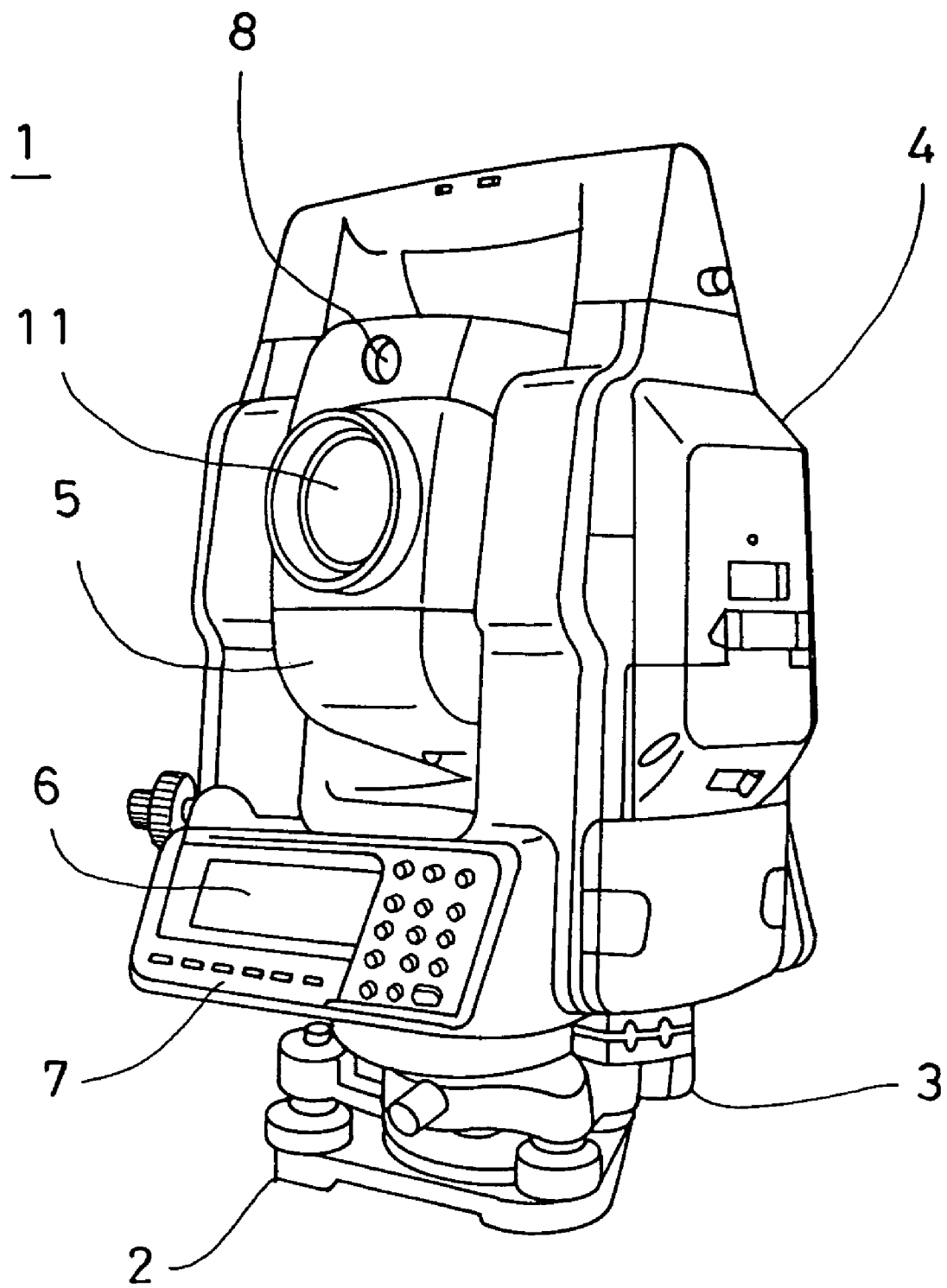
FIG. 1 is a perspective view to show an example of a surveying instrument according to the present invention.

FIG. 1 shows a surveying instrument 1, in which the present invention is carried out. The surveying instrument 1 used in the invention is a total station, for instance. A pulsed laser beam is projected toward a measuring point. Then, a reflection light from the measuring point is received, and a distance is measured for each pulse. By averaging the results of a distance measurement, the distance measurement with high accuracy can be achieved.

The surveying instrument 1 primarily comprises a leveling unit 2 installed on a tripod which is not shown, a base unit 3 mounted on the leveling unit 2, a frame unit 4 rotatably mounted on the base unit 3 around the vertical axis, and a telescope unit 5 rotatably mounted on the frame unit 4 around the horizontal axis.

The frame unit 4 comprises a display unit 6 and an operation input unit 7. The telescope unit 5 comprises a second telescope 11 for collimating an object to be measured and a second image pickup means 37 (to be described later) for acquiring an image in a collimating direction via an optical system of the second telescope unit 11. Further, the telescope unit 5 comprises a first telescope 8 with a magnification lower than that of the second telescope 11 and with wider range of the visual field, and a first image pickup means 40 (to be described later) for acquiring the image in the collimating direction or in an approximately collimating direction via a first telescope 8. As the first image pickup means 40 and the second image pickup means 19, a digital camera is used, for instance, which outputs an image thus picked up as a digital image signal.

An image pickup element, which is provided in the first telescope 8 and in the second telescope 11 respectively, is CCD or CMOS, etc., for instance, which is an aggregate of pixels. The position of a pixel can be specified by detection of the light, and a field angle can be determined from the position of the pixel.

Figure 2:
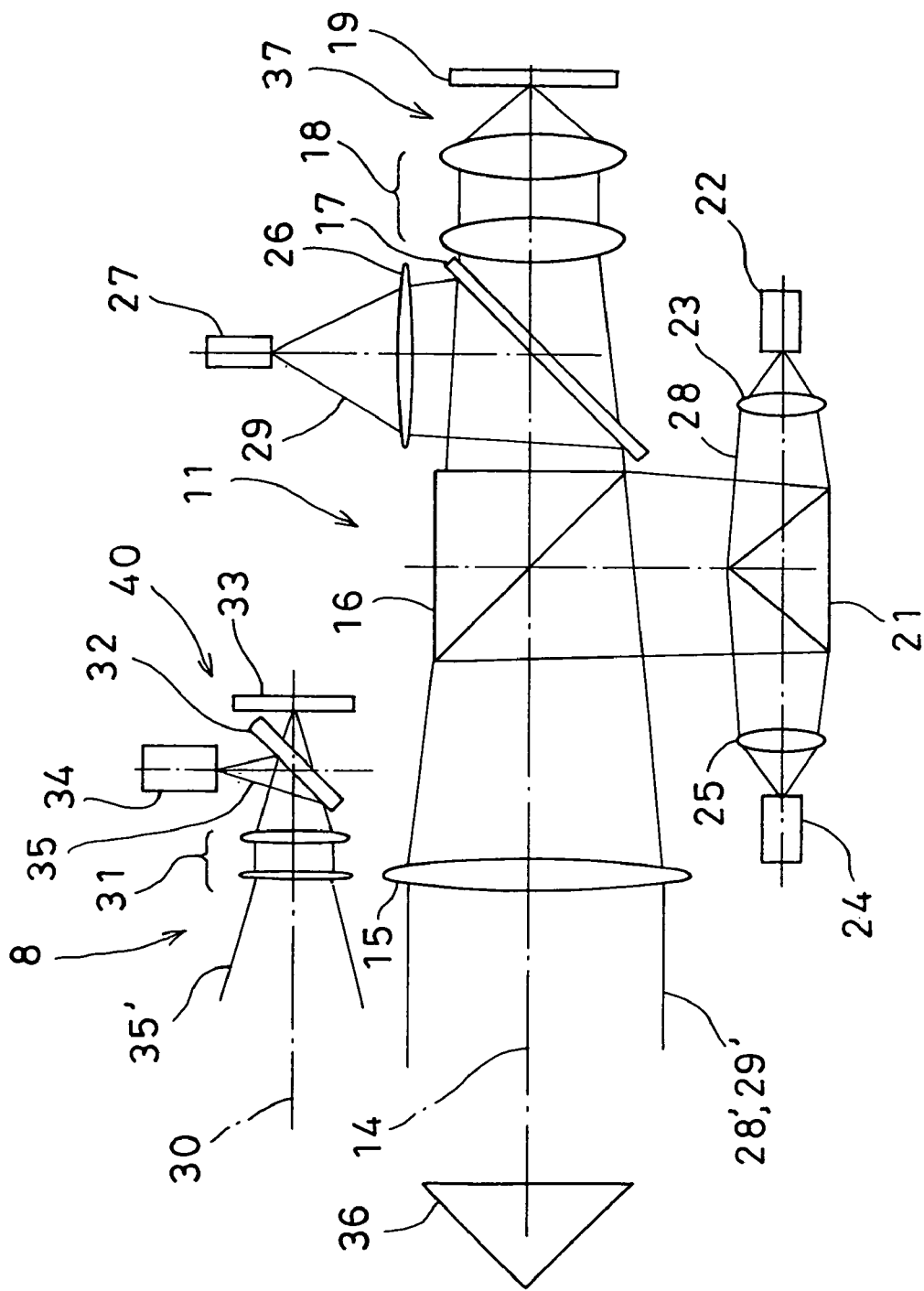
FIG. 2 is a schematical drawing to explain an approximate arrangement of an optical system in a first embodiment of the present invention.

FIG. 2 shows an approximate arrangement of an optical system of the surveying instrument according to the present invention.

First, a description will be given on the second telescope 11.

On a second optical axis 14 of the second telescope 11, there are arranged an objective lens 15, a dichroic mirror 16, which reflects an infrared light and allows a visible light to pass, a second half-mirror 17 to reflect a part of the visible light and to allow a part of the visible light to pass, a condenser lens 18, and a second solid image pickup element 19 such as CCD, CMOS, etc.

A second tracking light source 27 (to be described later), a condenser lens 26 (to be described later), the second half-mirror 17, the objective lens 15, the condenser lens 18, etc, make up together a second tracking light optical system. The second tracking light optical system and the second solid image pickup element 19 make up together a second image pickup means 37.

A triangular mirror 21 is arranged at a position to face to the dichroic mirror 16. A light emitting unit 22 and a condenser lens 23 are arranged at a position on one side to face to the triangular mirror 21. And a photodetection element 24 and a condenser lens 25 are arranged at positions on the other side. The light emitting unit 22 emits a modulated light, e.g. a modulated light of near infrared light by flashing.

The triangular mirror 21, the light emitting unit 22, the condenser lens 23, the photodetection element 24, the condenser lens 25, the objective lens 15, the dichroic mirror 16, etc. make up together a distance-measuring light optical system. The distance measuring light optical system and the second tracking light optical system commonly share the second optical axis 14 and the objective lens 15.

The condenser lens 26 is arranged at a position to face to the second half-mirror 17. The second tracking light source 27 is arranged on the optical axis of the condenser lens 26. The second tracking light source 27 emits a light with a wavelength to pass through the dichroic mirror 16 as a second tracking light 29.

The distance measuring light and the second tracking light are projected as parallel luminous fluxes via the objective lens 15.

Next, a description will be given on the first telescope 8.

The first telescope 8 has a first optical axis 30, which runs in parallel to the second optical axis 14. An objective lens 31, a first half-mirror 32 and a first solid image pickup element 33 such as CCD or CMOS, etc., are arranged on the first optical axis 30. A first tracking light source 34 is arranged at a position to face to the first half-mirror 32.

The first tracking light source 34 emits a first tracking light 35 via the objective lens 31. The first tracking light 35 emitted via the objective lens 31 has a spreading angle as required, which is larger than a spreading angle of the second tracking light 29. Specifically, the first telescope 8 has an angle of view wider than an angle of view of the second telescope 11 and can take an image in wider range than the second telescope 11.

The first tracking light source 34, the first half-mirror 32, the objective lens 31, etc. make up together a first tracking light optical system. The first tracking light optical system and the first solid image pickup element 33 make up together a first image pickup means 40.

Now, a description will be given on general features of the operation.

When a target 36 is searched by the first telescope 8 and the target 36 is detected by the first solid image pickup element 33, a vertical angle and a horizontal angle with respect to the first optical axis 30 are calculated from an image of the target on the first solid image pickup element 33. Based on the calculation results, the telescope unit 5 is rotated in vertical and horizontal directions, and the target 36 is set within a range, which can be tracked by the second telescope 11. That is, the direction of the second optical axis 14 is set in such manner that an image of the target 36 is formed on the second solid image pickup element 19.

The second tracking light 29 is emitted from the second tracking light source 27. A reflected second tracking light 29' reflected by the target 36 passes through the second half-mirror 17. After passing through the condenser lens 18, an image of the target is formed on the second solid image pickup element 19. The telescope unit 5 is rotated in such manner that a position of the target image on the second solid image pickup element 19 concurs with the second optical axis 14.

When the position of the target image corresponds with the second optical axis 14 on the second solid image pickup element 19, the distance measuring light 28 is emitted from the light emitting unit 22, and the distance measurement operation is started. The distance measuring light 28 is reflected by the triangular mirror 21 and the dichroic mirror 16. Then, the distance measuring light 28 is turned to parallel luminous fluxes by the objective lens 15 and is projected. A reflected distance measuring light 28' reflected by the target 36 enters via the objective lens 15, is reflected by the triangular mirror 21, and is received by the photodetection element 24 via the condenser lens 25.

A distance to a target is measured based on a phase difference between the reflected distance measuring light 28' and an internal reference light (not shown).

Figure 3:
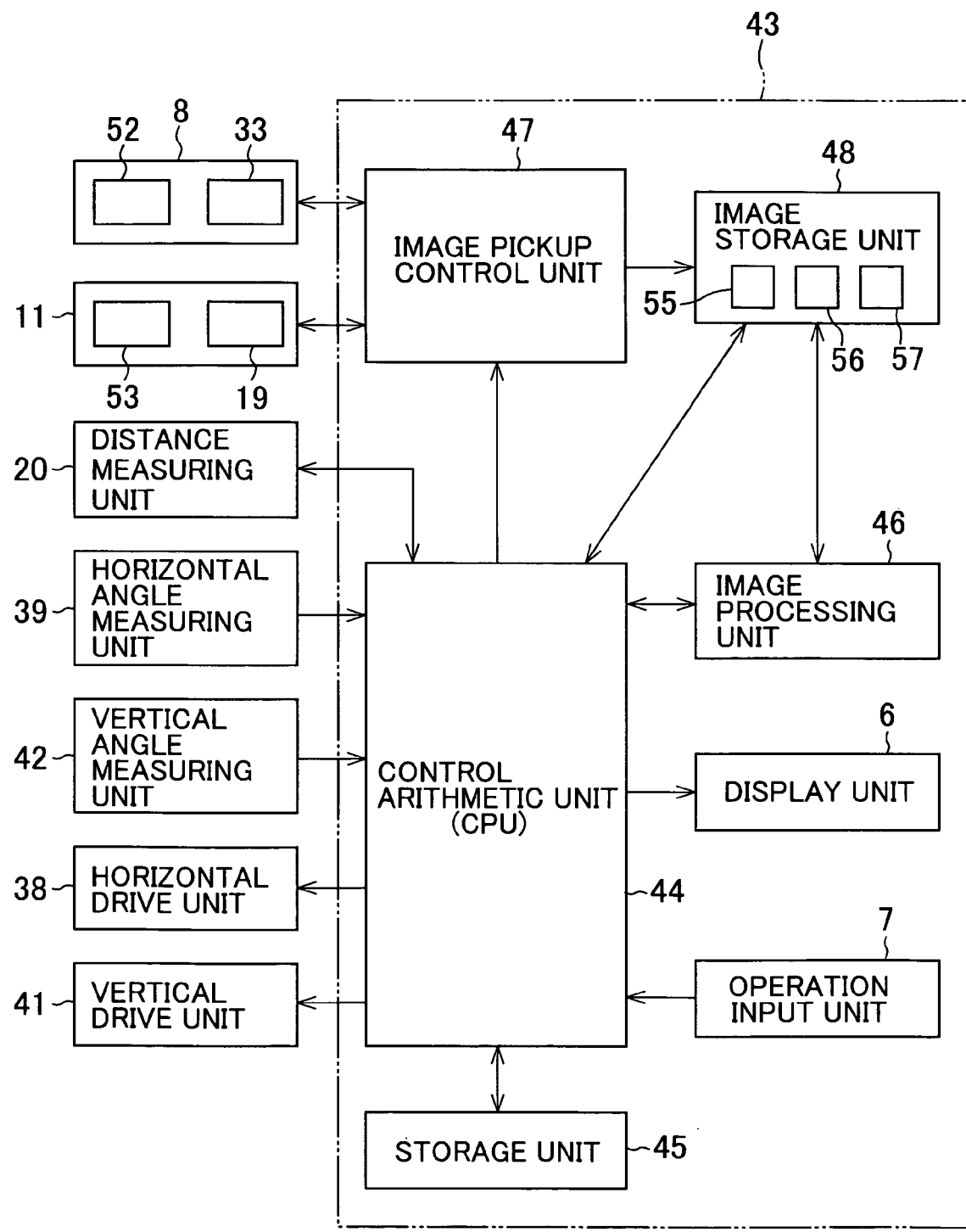
FIG. 3 is a basic block diagram of the embodiment of the present invention.

Referring to FIG. 3, a description will be given now on a basic arrangement of the surveying instrument 1.

The telescope unit 5 is incorporated with a distance measuring unit 20, which has the distance measuring light optical system. As described above, the distance measuring unit 20 projects a distance measuring light and receives a reflection light from the target 36 and performs electro-optical (light wave) distance measurement to the target 36.

On the frame unit 4, there is provided a horizontal drive unit 38 for rotating the frame unit 4 in horizontal direction. Also, a horizontal angle measuring unit 39 is provided, which detects a horizontal rotation angle of the frame unit 4 with respect to the base unit 3 and detects a horizontal angle in the collimating direction. A vertical drive unit 41 for rotating the telescope unit 5 around the horizontal axis is provided on the frame unit 4. Also, a vertical angle measuring unit 42 is provided on the frame unit 4, which detects a vertical angle of the telescope unit 5 and measures a vertical angle in the collimating direction.

The frame unit 4 is incorporated with a control instrument 43. The control instrument 43 controls the driving of the horizontal drive unit 38 and the vertical drive unit 41, rotates the frame unit 4 and the telescope unit 5, and directs the telescope unit 5 toward a predetermined direction. Then, the control instrument 43 scans over the predetermined range, controls a switchover between the first telescope 8 and the second telescope 11, acquires an image with the magnification as required, and measures a distance to the target 36 by controlling the distance measuring unit 20.

The control instrument 43 primarily comprises a control arithmetic unit 44, a storage unit 45, an image processing unit 46, an image pickup control unit 47, an image storage unit 48, a display unit 6, an operation input unit 7, etc.

In the storage unit 45, there are a program storage area for storing different types of programs and a data storage area for storing data such as the results of the measurement. In the program storage area, various types of programs are stored. These programs include: a calculating program necessary for the measurement or an image processing program for performing image processing as to be described later, a sequence program for selecting a measuring point from the processed image, for executing the distance measurement on a selected measuring point (target) and for tracking the measuring point, a search program for searching the target 36 when the target is missed out of sight at the starting of the measurement, and other programs.

The results of the measurement from the distance measuring unit 20, the horizontal angle measuring unit 39 and the vertical angle measuring unit 42 are inputted to the control arithmetic unit 44, and a distance, a horizontal angle and a vertical angle are measured. The measurement results are stored in the storage unit 45 via the control arithmetic unit 44 and are displayed on the display unit 6.

The first telescope 8 comprises the first solid image pickup element 33 and a first electronic shutter 52. The first electronic shutter 52 is driven by the image pickup control unit 47 in synchronization with flashing of the first tracking light source 34 so that an image when the first tracking light source 34 is turned on and an image when it is turned off can be acquired. The second telescope 11 comprises the second solid image pickup element 19 and a second electronic shutter 53. The second electronic shutter 53 is driven by the image pickup control unit 47 in synchronization with flashing of the second tracking light source 27 so that an image when the second tracking light source 27 is turned on and an image when it is turned off can be acquired.

The image storage unit 48 has a first storage unit 55, a second storage unit 56 and a third storage unit 57 as the storage area of image data acquired by the first solid image pickup element 33 and the second solid image pickup element 19.

The image processing unit 46 extracts only an image of the target 36 from the images stored in the image storage unit 48, determines a center of the image, determines a position of the target image on the first solid image pickup element 33 and the second solid image pickup element 19, and further, calculates a direction to the target 36.

Figure 4:
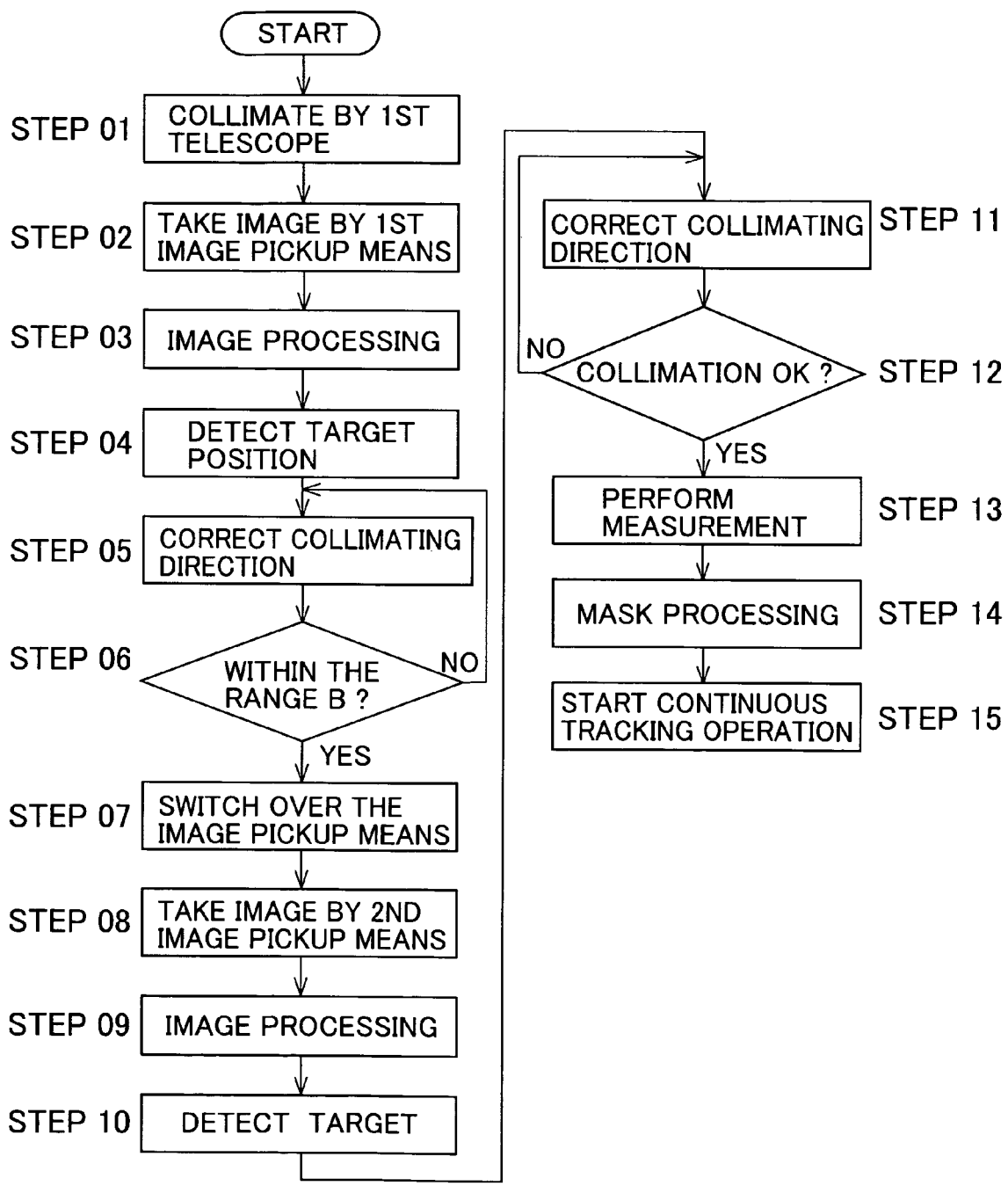
FIG. 4 is a flow chart to explain operation of the embodiment of the present invention.
Figure 5:
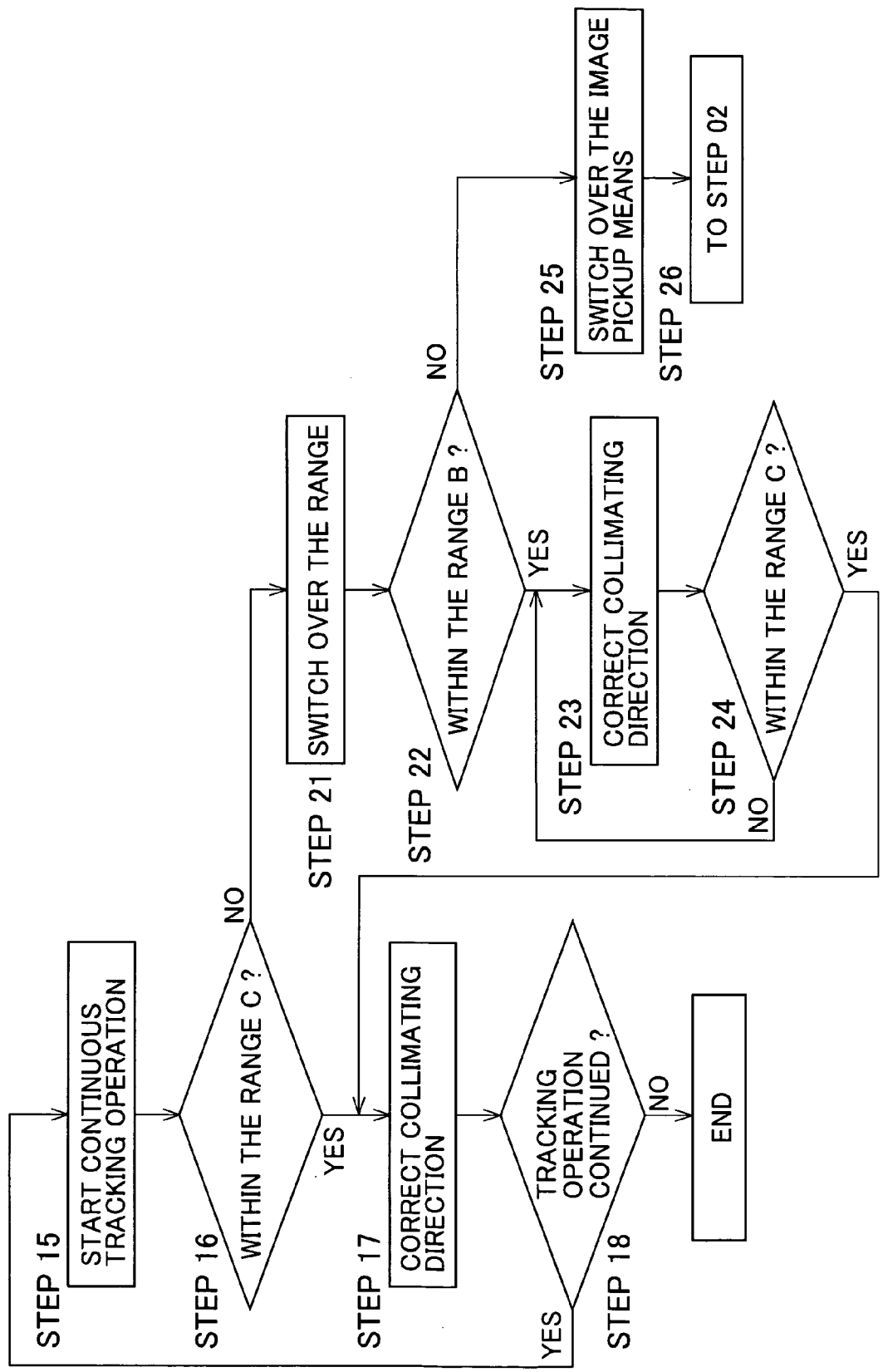
FIG. 5 is a flow chart to explain operation of the embodiment of the present invention.

Next, referring to FIG. 4, FIG. 5 and FIG. 6, a description will be given on operation of the present invention.

(Step 01) A target 36 is set up at a measuring point. The target 36 is collimated by the first telescope 8, and after confirming that the target 36 is within the field angle of the first telescope 8, the measurement and the tracking are started. FIG. 6(A) shows a field angle A of the first telescope 8 and a field angle B of the second telescope 11. In the figure, a reference numeral 36' denotes a target image.

(Step 02) When it is confirmed that the target image 36' is within the field angle A, an image is taken by the first image pickup means 40. An image when the first tracking light source 34 is turned on and an image when the first tracking light source 34 is turned off are acquired by the first image pickup means 40. The image when the light is turned on and the image when the light is turned off can be acquired by turning-on and turning-off operation of the first electronic shutter 52 in synchronization with the flashing of the first tracking light source 34. The image data when the light is turned on is stored in the first storage unit 55, and the image data when the light is turned off is stored in the second storage unit 56.

(Step 03) The image processing unit 46 subtracts, the image data when the light is turned off as stored in the second storage unit 56 from the image data when the light is turned on as stored in the first storage unit 55, and only the target image 36' is acquired. The image data of the target image 36' thus acquired is stored in the third storage unit 57. A process of the acquisition of the target image 36' by the subtraction is disclosed in JP-A-07-198383.

(Step 04) A weighted point of the target image 36' is obtained. Then, a position of the weighted point on the first solid image pickup element 33 is determined and a field angle can be obtained from a pixel, which corresponds to the weighted point position. One pixel on the first solid image pickup element 33 corresponds to a field angle of 30 seconds, for instance.

In the subsequent steps as given below, a procedure to obtain the target image 36' from the image acquired by the first image pickup means 40 and the procedure to obtain the field angle of the target image 36' can be carried out in similar manner.

(Step 05) Because the field angle corresponds to a deviation of angle of the direction of the target 36 with respect to the first optical axis 30, an angle of the first optical axis 30 to be corrected can be calculated from the field angle. Based on the results of calculation, the horizontal drive unit 38 and the vertical drive unit 41 are driven, and a collimating direction of the telescope unit 5 is corrected.

(Step 06) After the collimating direction has been corrected, it is judged whether the target image 36' is within the field angle B or not. If the target image 36' is out of the range, it should be returned to Step 05, and further, the collimating direction is corrected again.

(Step 07) If it is judged that the target image 36' is within the range, the image pickup means is changed over by the image pickup control unit 47, and the image is acquired by the second image pickup means 37.

(Step 08) The synchronization control of the on/off operation of the second electronic shutter 53 with the flashing of the second tracking light source 27 is executed by the image pickup control unit 47. An image when the second tracking light source 27 is turned on and an image when the second tracking light source 27 is turned off are acquired. The image data when the light is turned on is stored in the first storage unit 55, and the image data when the light is turned off is stored in the second storage unit 56.

(Step 09 and Step 10) The image processing unit 46 subtracts the image data when the light is turned off as stored in the second storage unit 56 from the image data when the light is turned on as stored in the first storage unit 55 and acquires only the target image 36'. A weighted point of the target image 36' is obtained, and a position of the weighted point on the second solid image pickup element 19 is determined. The field angle can be determined from a pixel corresponding to the weighted position. One pixel in the second solid image pickup element 19 is smaller compared with an angle of one pixel in the first solid image pickup element 33, and for instance, one pixel in the second solid image pickup element 19 corresponds to a field angle of 5 seconds. That is, a detection accuracy obtained at the second solid image pickup element 19 is higher compared with a detection accuracy obtained at the first solid image pickup element 33.

(Step 11) Because the field angle corresponds to a deviation of angle in the direction of the target 36 from the second optical axis 14, an angle of the second optical axis 14 to be corrected can be calculated from the field angle. Based on the results of calculation, the horizontal drive unit 38 and the vertical drive unit 41 are driven, and the collimating direction of the telescope 5 is corrected.

In the subsequent steps as described below, the procedure to obtain the target image 36' from the image acquired by the second image pickup means 37 and the procedure to determine the field angle of the target image 36' can be carried out in similar manner.

(Step 12 and Step 13) It is judged whether the position of the target image 36' corresponds with the second optical axis 14 or not. If the position of the target image 36' does not correspond, the collimating direction is corrected further. When the collimating direction corresponds with or approximately corresponds with the target 36, the distance measurement is repeatedly carried out. The measurements of the horizontal angle and the vertical angle are executed at all times regardless of whether the distance measurement is performed or not.

(Step 14) When the second optical axis 14 corresponds or approximately corresponds with the target 36, the mask processing is performed on a photodetection signal of the second solid image pickup element 19 at the same time as the distance measurement or prior to the starting of the distance measurement.

As shown in FIG. 6(B), by the mask processing, the acquisition of the image data from the second solid image pickup element 19 is limited to the range C around the second optical axis 14 as a center. The mask processing described above reduces the amount of processing data, alleviates the burden on the control arithmetic unit 44 and increases the processing speed. By performing the mask processing, disturbance light can be reduced and the erroneous operation in the tracking operation can be prevented.

The range C is set in circular shape or in elliptical shape with longer axis in horizontal direction. The size of the range C is determined by a moving speed of the target 36, the distance to be measured, etc. It may be so designed that the size of the range C can be changed according to the measuring condition, for instance, according to the distance to be measured, etc.

(Step 15) The tracking operation is carried out at all times to the target 36. During the tracking operation, the distance measurement is continuously performed.

(Step 16 and Step 17) It is judged whether the target image 36' is within the range C or not. When it is judged that the target image 36' is within the range C, the collimating direction is corrected. When the collimating direction of the second telescope 11 corresponds or approximately corresponds with the target 36, the measurement data on the target 36 is acquired.

(Step 18) It is judged whether the tracking operation should be continued or not. When an instruction to terminate the tracking is given, the tracking operation is terminated. When the instruction to terminate the tracking is not received, it goes back to Step 15, and the tracking operation is continued.

(Step 21) In case it is judged that the target image 36' is not within the range C in Step 16, the mask processing is abandoned.

(Step 22 and Step 23) It is judged whether the target image 36' is within the field angle B or not. If it is within the field angle B, the field angle on the target image 36' is determined, and the collimating direction is corrected by the field angle.

(Step 24) In case it is judged that the collimating direction is within the range C, it goes back to step 17.

(Step 25 and Step 26) In Step 22, it is judged whether the target image 36' is within the field angle B or not. In case the target image 36' is not within the field angle B, i.e., is out of the field angle B, the image pickup means is switched over by the image pickup control unit 47. Then, it goes back to Step 02, and an image of a wider field angle is acquired by the first image pickup means 40.

Because the image of the target 36 is taken in a wide range by the wide field angle, even when the target 36 is deviated from the field angle B, there is no need to search it again, and the target 36 can be detected promptly.

Further, from the image acquired, the procedure in Step 03 and the subsequent procedure are executed, i.e. the target image 36' as well as the position and the field angle of the target image 36' can be obtained.

According to the present invention, in case of the normal movement of the target 36, the small image processing is performed within the range C where the tracking function of the surveying instrument 1 can fulfill the purpose. As a result, the burden on the image processing is alleviated. The processing speed is increased, and the erroneous operation caused by noise can be prevented. Further, when the target 36 moves out of the field angle B, an image in a wider range is acquired by the first image pickup means 40 and the target 36 is detected. Accordingly, the procedure can be promptly brought back to the tracking operation without searching the target. Thereby, a time for re-searching can be reduced, the efficiency of the measuring operation is improved, and the operation time can be reduced.

FIG. 7 shows a second embodiment of the invention.

In FIG. 7, the same component as shown in FIG. 2 is referred by the same symbol.

In the second embodiment, the optical axis of the first telescope 8 is made identical with the optical axis of the second telescope 11. An optical axis branching mirror 59 is arranged on the second optical axis 14. A first tracking light 35 from the first tracking light source 34 is emitted along the second optical axis 14 via the optical axis branching mirror 59. Then, a reflected first tracking light 35' which is incident via the objective lens 15 is reflected by the optical axis branching mirror 59 and is guided toward the first solid image pickup element 33.

What is claimed is:

1. A surveying instrument provided with a tracking function, comprising a first image pickup means with a first solid image pickup element, a second image pickup means with a second solid image pickup element, an image pickup control instrument for controlling image pickup conditions of said first image pickup means and said second image pickup means, and a control unit for controlling the tracking operation of a target based on a target image signal obtained at said first solid image pickup element or based on a target image signal obtained at said second solid image pickup element, wherein said first image pickup means can acquire an image in wider range by said second image pickup means, and wherein said image pickup control instrument controls in such manner that a target image is acquired by said first image pickup means when the target image is out of a photodetection range of the target of said second solid image pickup element and controls in such manner that the target image is acquired by said second image pickup means when the target image detected by said first solid image pickup element is within a predetermined range, and wherein a predetermined range including an optical axis of said second image pickup means is set up, and when a photodetection position of the target by said second solid image pickup element is included in said predetermined range, a mask processing is performed on said second solid image pickup element in such manner that a photodetection signal of said predetermined range is acquired, and the tracking operation is performed based on a photodetection signal of said predetermined range.

2. A surveying instrument according to claim 1, wherein said control unit searches the target based on a target image signal obtained at said first solid image pickup element, and performs a collimation for a measurement based on a target image signal obtained at said second solid image pickup element.

3. A surveying instrument according to claim 1 or 2, wherein, when a photodetecting position of the target is out of a predetermined range, a mask processing is canceled and the tracking operation is performed based on a photodetection signal from said second solid image pickup element.

4. A surveying instrument according to claim 3, wherein said predetermined range is in circular shape with the optical axis as a center.

5. A surveying instrument according to claim 3, wherein said predetermined range is in elliptical shape with longer axis in horizontal direction and with said optical axis as a center.

6. A surveying instrument according to claim 3, wherein an extent of said predetermined range is set up according to a moving speed of the target and/or to a distance to be measured.

7. A surveying instrument according to claim 1 or 2, wherein said predetermined range is in circular shape with the optical axis as a center.

8. A surveying instrument according to claim 1 or 2, wherein said predetermined range is in elliptical shape with longer axis in horizontal direction and with said optical axis as a center.

9. A surveying instrument according to claim 1 or 2, wherein an extent of said predetermined range is set up according to a moving speed of the target and/or to a distance to be measured.

10. A surveying instrument according to claim 1 or 2, wherein the smallest field angle obtained by said second image pickup means is smaller than the smallest field angle obtained by said first image pickup means.

* * * * *